US006401095B1

(12) United States Patent
Adler

(10) Patent No.: US 6,401,095 B1
(45) Date of Patent: Jun. 4, 2002

(54) GEOGRAPHICALLY SENSITIVE AUTOMATED NOTICE SYSTEM

(76) Inventor: Robert M. Adler, 400 N. Flagler Dr., D-2, West Palm Beach, FL (US) 33401

( * ) Notice: Subject to any disclaimer, the term of this patent is extended or adjusted under 35 U.S.C. 154(b) by 0 days.

(21) Appl. No.: 09/400,036

(22) Filed: Sep. 21, 1999

(51) Int. Cl.[7] .............................................. G06F 17/30
(52) U.S. Cl. ....................................................... 707/10
(58) Field of Search ........................ 707/10; 340/573.3; 379/67.1; 40/300; 342/357.07

(56) References Cited

U.S. PATENT DOCUMENTS

| | | | |
|---|---|---|---|
| 5,036,610 A | 8/1991 | Fehr ............................. | 40/300 |
| 5,878,116 A | 3/1999 | Scott .......................... | 379/67.1 |
| 6,067,018 A | * 5/2000 | Skelton et al. ........... | 340/573.3 |

OTHER PUBLICATIONS

Sherlock Bones, www.sherlockbones.com, pp. 1–7, 1997.*

* cited by examiner

*Primary Examiner*—Sanjiv Shah
(74) *Attorney, Agent, or Firm*—McHale & Slavin

(57) ABSTRACT

The present invention is a system that utilizes the global computer network ("Internet") to provide an intelligent and powerful pet notification system for canvassing specific geographical areas in a matter of seconds to aid in the location of a lost pet. Utilizing an on-line pet interview and active web site engine, a photo e-mail of the lost pet can be distributed instantaneously to reach a large segment of the community. The notification system retains information about pets and their owners, including photographs. Upon notification of the loss of a pet, the system will initiation calculations, based upon the last known location, particular size and breed of the pet and an estimate of how long it has been missing, to determine the most appropriate target area for the search.

7 Claims, 5 Drawing Sheets

WWW.BESTFRIENDLOST.COM

Gold Medal Rescue Center

Relax - We are here to help! You have the world's most advanced pet search system working for you now. Your pet's picture and description will be mass distributed throughout your entire neighborhood in just minutes, but first we must verify that we have accurate data.

Please enter the following information carefully, then click SUBMIT.

Please enter your name:   First [         ] Middle [  ] Last [           ]

Home Phone [   ][       ]

Please enter your pet's name:   [         ]

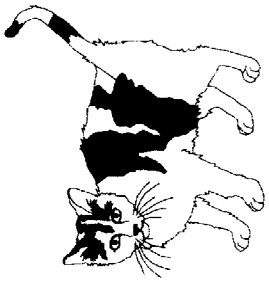

WWW.BESTFRIENDLOST.COM

Gold Medal Rescue Center

Relax - We are here to help! You have the world's most advanced pet search system working for you now. Your pet's picture and description will be mass distributed throughout your entire neighborhood in just minutes, but first we must verify that we have accurate data.

Please enter the following information carefully, then click SUBMIT.

Please enter your name: First [ ] Middle [ ] Last [ ]

Home Phone [ ]

Please enter your pet's name: [ ]

SUBMIT

*FIG. 1*

| | | |
|---|---|---|
| 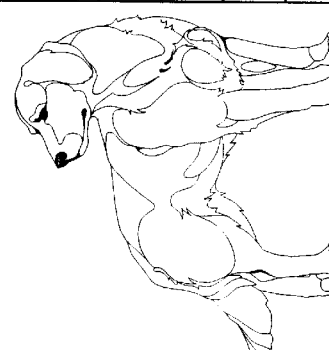 | Pet Owner: | Oscar Rodriguez |
| | Address: | 412 S.W. 22nd Street, Miami FL 33193 |
| | Telephone: | (305) 860-4019 |
| | e-mail: | oscar@visualcom.net |
| | Pet Name: | Bumper |
| | Breed: Golden Retriever | Age: 7 Sex: Male |
| | Color: Gold Wt: 100lb | Ht: 3.5' |
| | Disposition: Friendly | |
| | Identification: White snout | |

Personal Message:

You can say anything you like from offering a cash reward to the last place your pet was seen. Everyone will understand your urgency.

Please click one of the following two buttons concerning the accuracy of the information on your Pet Photo E-mail.

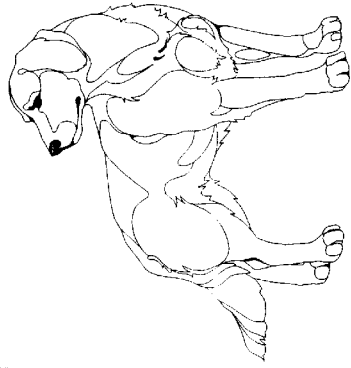
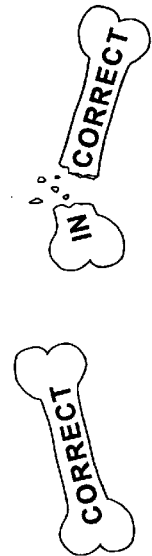

FIG. 2

In addition, many people will print out Bumper's Photo E-mail and post it at work or play.
The additional exposure will be in the thousands - within 24 hours!

Plan 1. We have canvassed this 10 sq. mile geographic area:

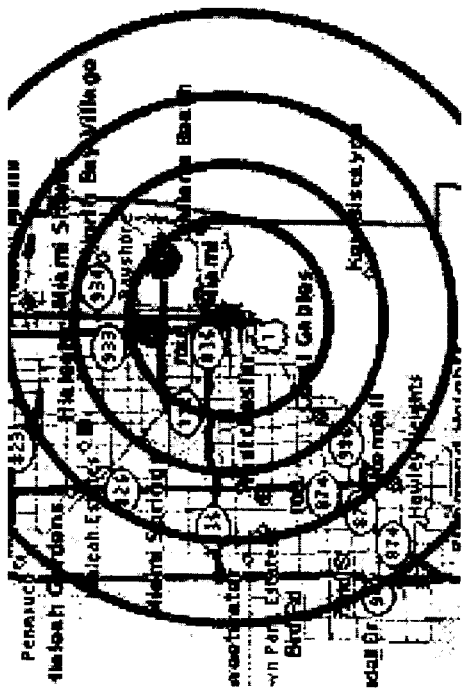

Please leave your phone lines open.

If Bumper has not been found in the next
8 hours, notify us immediately for Plan 2.

Click here to receive important instructions for what to do now!

*FIG. 3*

Bumper's Search is now underway!

1,780 Photo E-mails are now being mass distributed to:

16 Police/Fire Departments

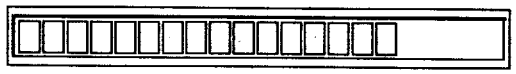

37 Veterinarians

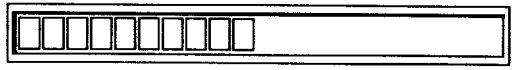

6 Humane Societies

1,832 Volunteer Pet Lovers

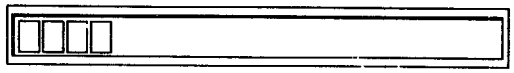

33 Television / Radio Stations

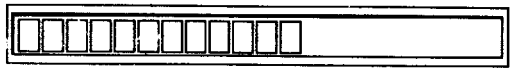

35 Churches • Synagogues • Temples

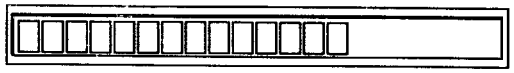

21 Schools

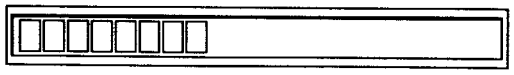

If you would like a hard copy of the names, addresses, phone numbers, and emails of where Bumper's Photo E-mail was sent, Click here

Now click

*FIG. 4*

GEOGRAPHICALLY SENSITIVE AUTOMATED NOTICE SYSTEM

FIELD OF THE INVENTION

This invention relates to a geographically sensitive system for noticing lost articles; the invention particularly relates to a system for the prompt notification of lost pets by use of a global computer network.

BACKGROUND OF THE INVENTION

The loss of one's personal property, whether by chance or as the result of theft, is often devastating. When the lost item is a living being, for example a child or pet, the loss is catastrophic. While the loss of a child brings together numerous governmental agencies, e.g. police departments, the FBI, fire departments, etc., the loss of a pet fails to send out such a critical alarm, and therefore the response to a pet's loss is minimal at best.

The statistics pertaining to pet recovery speak for themselves —in the United States alone, there are 112 million dogs and cats, 20% of which, some 22.4 million, will become lost each year. Greater than 50% of these will never be found alive, leaving 11.2 million households grieving for their lost and beloved family friend.

The options available to pet owners are few—putting up posters, calling individuals familiar with the pet, contacting police stations, etc., however response and rescue time remain most critical. Motor vehicles, euthanasia, predators and starvation claim one of every two pets who never return home. What is lacking is a notification system capable of providing notice to a geographically sensitive area upon discovery of a lost pet.

DESCRIPTION OF THE PRIOR ART

U.S. Pat. No. 5,036,610 describes a system for identifying a lost pet and locating its owner by use of a pet tag or collar having a telephone number and a unique code number imprinted thereon. Information about the pet owner, stored at a central clearing house under the unique number, is retrievable in response to a telephone call from a finder of the pet. This system lacks any ability to alert public or private institutions or individuals regarding the pet's disappearance, and it certainly does not take into account any information which would enable the selection of a geographic area having a high probability of containing the lost pet.

U.S. Pat. No. 5,878,116 is drawn to a method for locating lost pet, person or object. The method describes use of an identification number contained on a card held by the owner and on a tag attached to the item.

The prior art suffers from an inability to distribute an alert regarding the lost pet 1) in a timely fashion, and 2) to an appropriate geographical area, to maximize the probability of recovery.

Therefore, if a method for finding a lost pet could be devised which would alert the appropriate personnel that a particular pet was missing in their location, at that instant in time, a long-felt need in the art would be satisfied.

SUMMARY OF THE INVENTION

The present inventor has developed a system which utilizes the technological power provided by the global computer network ("Internet") to provide an intelligent and powerful pet notification system for canvassing specific geographical areas in a matter of seconds. By use of an on-line pet interview and active web site engine, a photo e-mail of the lost pet can be distributed instantaneously to reach a large segment of the community, including veterinarians, humane societies, police agencies, TV, Radio stations, churches, synagogues, and a volunteer group of pet lovers who will help owners search for their lost pets in a time of emergency. The notification system has the capability of retaining information about pets and their owners, including photographs. Present technology makes it possible to scale a single system to handle all pets licensed in the United States. Upon notification of the loss of a pet, the system will instantly calculate the geographical location within which the pet is most likely to be present. Using the pet's home zip code, the system will initiation calculations, based upon the particular size and breed of the pet and an estimate of how long it has been missing, to determine the most appropriate target area for the search.

Utilizing high speed distribution of lost pet photo e-mails, at speeds of about 30,000 per minute; and high speed distribution of emergency phone calls, at speeds of about 10,000 per 15 minutes; the system will utilize the enormous popularity and communicating power of the Global computer network to activate a proactive on-line technology. The system will instantly canvass large geographic areas in seconds, distributing vital information to strategically positioned members of the local pet community in order to reunite the pet and its owner. Up to 400 simultaneous request for registration or emergency pet searches can be handled by the system. Thousands of caring people will be alerted within minutes of notification that an animal is lost, enabling the pet loving community to come together quickly and galvanize their efforts to locate the lost animal.

While the system has been described with respect to a missing pet, it is not limited thereto. The present inventor contemplate the use of the system for finding missing persons, both child and adult, and for finding lost articles or possessions.

Accordingly, it is an objective of the instant invention to teach a system which utilizes the global computer network to initiate a notification process to help in locating a lost object, particularly a lost pet.

It is a further objective of the instant invention to t provide a method of operating a pet interview and active web site engine via the global computer network, which provides speed, scalability, reliability and security.

It is yet another objective of the instant invention to teach a pet notification system which provides for registration of the pet online via inclusion of scanned photographs.

It is a still further objective of the invention teach a system which determines an optimum exposure area for distribution of information regarding the lost animal based upon input of critical data regarding species, time lost and last known location.

Other objects and advantages of this invention will become apparent from the following description taken in conjunction with the accompanying drawings wherein are set forth, by way of illustration and example, certain embodiments of this invention. The drawings constitute a part of this specification and include exemplary embodiments of the present invention and illustrate various objects and features thereof.

BRIEF DESCRIPTION OF THE FIGURES

FIG. 1 is an input screen for registration of a pet and its owner with the system;

FIG. 2 is an input screen for notification of the system regarding the disappearance of a pet;

FIG. 3 is a system generated response which alerts the lost pet's owner as to the calculated search area;

FIG. 4 is a real-time screen which illustrates distribution of the alert through the system;

DETAILED DESCRIPTION OF THE INVENTION

Figure 5:
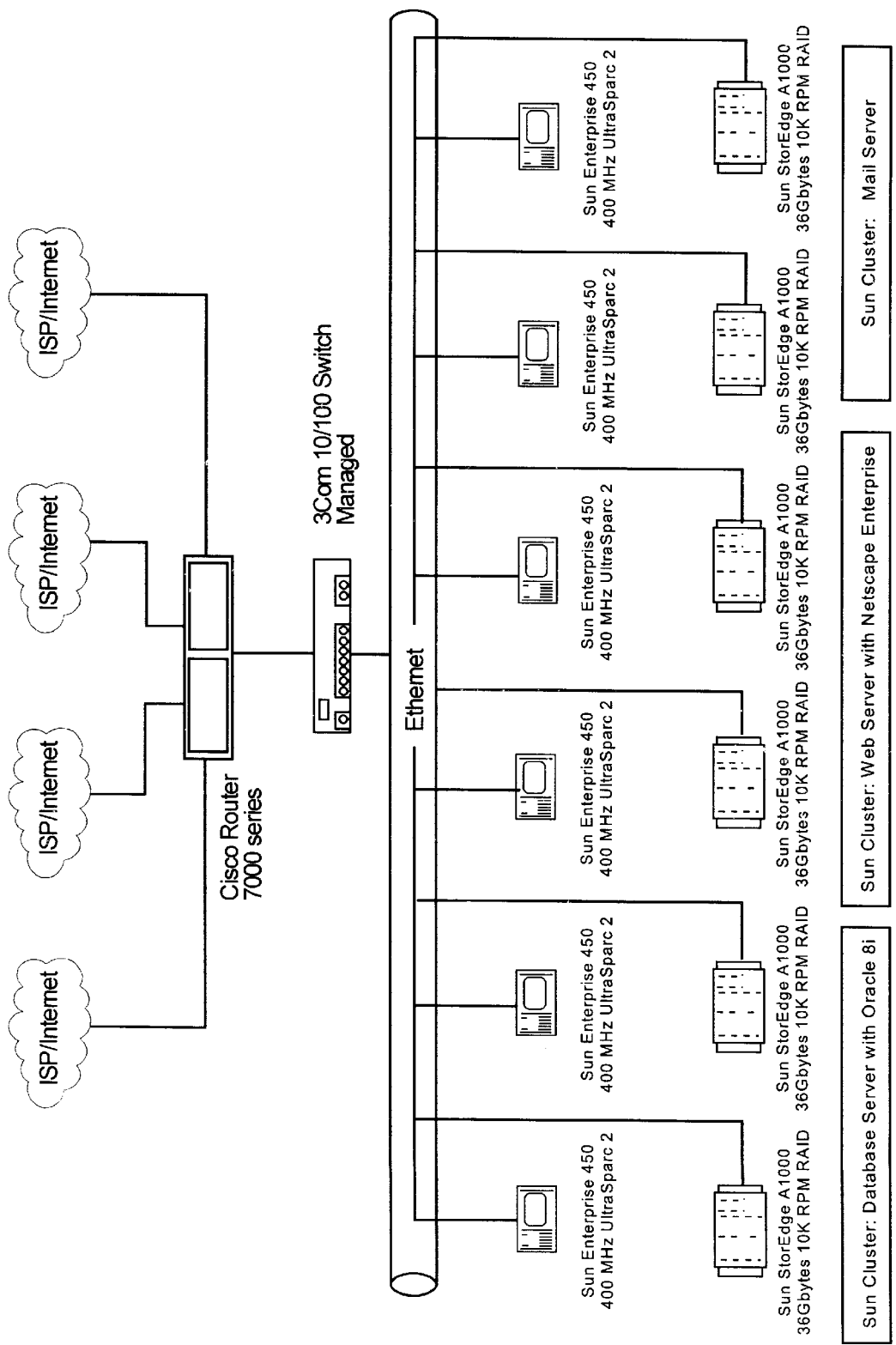
FIG. 5 is an example of the system architecture.

As an initial preventive measure, a concerned pet owner, hoping to more easily recover their pet in the event of a loss, purchases a pet ID tag which contains a unique identifying code. Such ID tags would be available at animal shelters, humane societies, veterinarians, pet stores and the like. The pet owner then registers their pet, either online via the global computer network, or by mail, including various identifying information regarding both the pet and its owner. A photo of the pet can be included either by mail or it may be scanned so as to be in a digital format and then forwarded via the global computer network. The system's web site is structured to provide a registration process and a pet search engine interface. The information is stored within the system server in a computer retrievable format.

The process of the instant invention provides an automated method for coordinating a notification procedure for aiding in locating a lost pet via the global computer network comprising the steps of providing a means for submission of identifying data for registration of a particular pet; storing said identifying data in a computer retrievable format accessible via the global computer network; developing a database inclusive of public and private institutions and individuals selected to receive notification of lost pets via the global computer network; maintaining said database in a computer retrievable format for access via the global computer network; providing a means for global computer network receipt of notification of loss of a registered pet and critical data pertinent thereto; activating an algorithm designed to compute, from said critical pertinent data, a geographical area within which the lost pet is projected to have the highest probability of being resident; and providing a mechanism for distribution of an electronic mail alert notification to all of said public and private institutions and individuals within the computed area.

The invention further provides a lost pet notification computer for creation of individualized notifications of lost pets to be transferred via the global computer network, comprising:

an information submission module executable at said notification computer, said information submission module configured for submission of information relating to a particular pet, characterized by identification of said pet and specific information relating to the loss thereof; and an automated e-mail distribution module executable at said notification computer, said e-mail distribution module configured to select and distribute e-mail notifications regarding said lost pet to public and private institutions and individuals calculated to be resident within a geographical location projected to have the highest probability of containing the lost animal. In a particularly preferred embodiment, the system further includes an advertising module executable at an advertisement provider computer, said advertising module configured to select advertisement content from a database of advertisers located within the geographical location projected by said distribution module, and further configured to provide said advertisement in conjunction with said e-mail notifications.

Now with reference to the accompanying figures, FIG. 1 shows an input screen for entering basic registration information regarding a pet and its owner into the system.

Referring to FIG. 2, an input screen for notification of the system regarding the disappearance of a pet is shown. Upon determining that a pet is missing, a concerned owner utilizes their computer, or a telephone, to contact the system with perinent information relating to the pet and its disappearance. It is possible for the owner to include their name, address, telephone number, e-mail address, and a personal message. The pet owner can also include information regarding the pet, including name, breed, age, sex, color, weight, height disposition and additional identifying data.

As next shown in FIG. 3, utilizing this data, the system can utilize an algorithm designed to calculate the geographical area deemed to have the highest probability of finding the animal. A map of the area is generated for the owner, along with instructions as to how to the owner should proceed after a given amount of time.

Referring to FIG. 4, a real-time screen which illustrates distribution of the alert through the system is broadcast to the owner via the global computer network. This allows the owner to visualize the progress of the system in distributing the notification of their pet's disappearance.

With reference to FIG. 5, a diagram exemplifying the system architecture is shown. The notification system will be divided into four main parts:

1) processing/database system;

2) messaging system;

3) web server; and 4) network/telecom infrastructure.

The database server will rely on two SUN ENTERPRISE 450 servers or equivalents configured to operate as a cluster. ORACLE SERVER EE 8i, coupled with ORACLE PARALLEL SERVER or equivalents will optimize the SUN cluster architecture to provide an optimum database system. Data processing will be handled by ORACLE APPLICATION SERVER ENTERPRISE and ORACLE INTERMEDIA or equivalents.

The messaging system will be based upon a cluster architecture also and will utilize at least two SUN ENTERPRISE 2 Model 1400 servers to support SUN's SENDMAIL messaging server.

Using the same physical architecture as the messaging system, the web server will implement NETSCAPE ENTERPRISE SERVER.

The network/telecom will utilize a device having the capabilities of a CISCO 7500 Series router, particularly preferred is a CISCO 7576. Desirable characteristics are LAN/WAN services support, redundancy, reliability and performance. Scalability is accomplished due to a bandwidth extensible to 4 Gbps. Switching is accomplished via a 3COM SUPERSTACK II Switch 3300 or equivalent.

While it is understood that the lost item has been described as a lost pet, the invention is not limited thereto.

It is to be understood that while a certain form of the invention is illustrated, it is not to be limited to the specific form or arrangement of parts herein described and shown. It will be apparent to those skilled in the art that various changes may be made without departing from the scope of the invention and the invention is not to be considered limited to what is shown and described in the specification and drawings.

What is claimed is:

1. A method for coordinating a notification procedure for aiding in the locating of a missing pet via the global computer network comprising:

provinding a means for submission of identifying data for registration of a particular pet;

storing said identifying data in a computer retrievable format accessible via the global computer network;

developing a database inclusive of public and private institutions and individuals selected to receive notification of missing pets via the global computer network;

maintaining said database in a computer retrievable format for access via the global computer network;

providing a means for global computer network receipt of notification of loss of a registered pet and critical data pertinent thereto;

activating an algorithm based on time and distance designed to compute, from said critical pertinent data, a geographical area within which the lost pet is projected to have the highest probability of being resident; and providing a mechanism for distribution of an electronic mail alert notification to all of said public and private institutions and individuals within said geographical area.

2. The method of claim 1 wherein the critical pertinent data includes the lost pet's breed, age, weight, and period of time that the lost pet has been known to be missing.

3. The method of claim 1 wherein the means for submission is a questionnaire adapted to be completed via the global computer network.

4. The method of claim 1 wherein the method further includes obtaining and attaching a unique identifying tag to the pet.

5. A lost pet notification computer for creation of individualized notifications of lost pets to be transferred via the global computer network, comprising:

an information submission module executable at said notification computer, said information submission module configured for submission of information relating to a particular pet, characterized by identification of said pet and specific information relating to the loss thereof; and an automated e-mail distribution module executable at said notification computer, said e-mail distribution module configured to select and distribute e-mail notifications regarding said lost pet to public and private institutions and individuals calculated to be resident within a geographical location projected to have the highest probability of containing the lost animal.

6. The lost pet notification computer in accordance with claim 5, wherein said computer is associated with a website which is comprised of a plurality of computers.

7. The lost pet notification computer in accordance with claim 5, further including:

an advertising module executable at an advertisement provider computer, said advertising module configured to select advertisement content from a database of advertisers located within the geographical location projected by said distribution module, and further configured to provide said advertisement in conjunction with said e-mail notifications.

* * * * *